(12) United States Patent
Dasgupta et al.

(10) Patent No.: US 12,449,596 B2
(45) Date of Patent: Oct. 21, 2025

(54) OPTICAL INPUT/OUTPUT INTERFACES BETWEEN PHOTONICS CHIPS

(71) Applicant: GlobalFoundries U.S. Inc., Malta, NY (US)

(72) Inventors: Arpan Dasgupta, Beacon, NY (US); Yusheng Bian, Ballston Lake, NY (US); John M. Safran, Wappingers Falls, NY (US); Norman Robson, Fishkill, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 303 days.

(21) Appl. No.: 18/127,220

(22) Filed: Mar. 28, 2023

(65) Prior Publication Data
US 2024/0329308 A1    Oct. 3, 2024

(51) Int. Cl.
*G02B 6/122* (2006.01)
*G02B 6/13* (2006.01)

(52) U.S. Cl.
CPC .......... *G02B 6/1228* (2013.01); *G02B 6/13* (2013.01)

(58) Field of Classification Search
CPC .......... G02B 6/30; G02B 6/1228; G02B 6/13
See application file for complete search history.

(56) References Cited

U.S. PATENT DOCUMENTS

| | | | |
|---|---|---|---|
| 6,293,688 B1 * | 9/2001 | Deacon | G02B 6/42 362/556 |
| 9,297,971 B2 | 3/2016 | Thacker et al. | |
| 10,690,845 B1 | 6/2020 | Jacob et al. | |
| 10,852,492 B1 * | 12/2020 | Vermeulen | G02B 6/423 |
| 11,043,478 B2 | 6/2021 | Traverso et al. | |
| 11,536,903 B1 | 12/2022 | Letavic et al. | |
| 2014/0112629 A1 | 4/2014 | Numata et al. | |
| 2016/0149662 A1 * | 5/2016 | Soldano | G02B 6/34 385/14 |
| 2018/0314151 A1 | 11/2018 | Koch et al. | |
| 2021/0356684 A1 * | 11/2021 | Wu | G02B 6/2935 |
| 2022/0035107 A1 * | 2/2022 | Raval | G02B 6/4228 |

OTHER PUBLICATIONS

Muhammad Rodlin Billah et al., "Hybrid integration of silicon photonics circuits and InP lasers by photonic wire bonding," Optica 5, 876-883 (2018).
Siyuan Yu, "Potentials and challenges of using orbital angular momentum communications in optical interconnects," Optics Express 23, 3075-3087 (2015).

(Continued)

*Primary Examiner* — Michael P Mooney
(74) *Attorney, Agent, or Firm* — Thompson Hine LLP; Anthony Canale

(57) ABSTRACT

Structures including multiple photonics chips and methods of fabricating a structure including multiple photonics chips. The structure comprises a first chip including a first edge and a first plurality of optical couplers disposed at the first edge, and a second chip including a second edge adjacent to the first edge of the first chip and a second plurality of optical couplers. The second plurality of optical couplers are disposed at the second edge adjacent to the first plurality of optical couplers.

19 Claims, 6 Drawing Sheets

(56) References Cited

OTHER PUBLICATIONS

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al, "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3I.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3.

Dezfulian, Kevin et al., "Photonics Chips With Reticle Stitching by Back-To-Back Tapered Sections" filed Jun. 23, 2022 as a U.S. Appl. No. 17/847,399.

European Patent Office, Extended European Search Report and Opinion issued in European Patent Application No. 23198430.3 on Feb. 26, 2024; 8 pages.

* cited by examiner

OPTICAL INPUT/OUTPUT INTERFACES BETWEEN PHOTONICS CHIPS

BACKGROUND

The disclosure relates to photonics chips and, more specifically, to structures including multiple photonics chips and methods of fabricating a structure including multiple photonics chips.

Photonics chips are used in many applications and systems including, but not limited to, data communication systems and data computation systems. A photonics chip includes a photonic integrated circuit comprised of optical components, such as modulators, polarizers, and optical couplers, that are used to manipulate light received from a light source, such as a laser or an optical fiber. Space on a photonics chip for the placement of the photonic integrated circuit is limited, which may limit the space available for optical input/output channels used to provide external communication paths.

Improved structures including multiple photonics chips and methods of fabricating a structure including multiple photonics chips are needed.

SUMMARY

In an embodiment of the invention, a structure comprises a first chip including a first edge and a first plurality of optical couplers disposed at the first edge, and a second chip including a second edge adjacent to the first edge of the first chip and a second plurality of optical couplers. The second plurality of optical couplers are disposed at the second edge adjacent to the first plurality of optical couplers.

In an embodiment of the invention, a method comprises forming a first chip including a first edge and a first plurality of optical couplers disposed at the first edge, and forming a second chip including a second edge adjacent to the first edge of the first chip and a second plurality of optical couplers disposed at the second edge adjacent to one of the first plurality of optical couplers.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
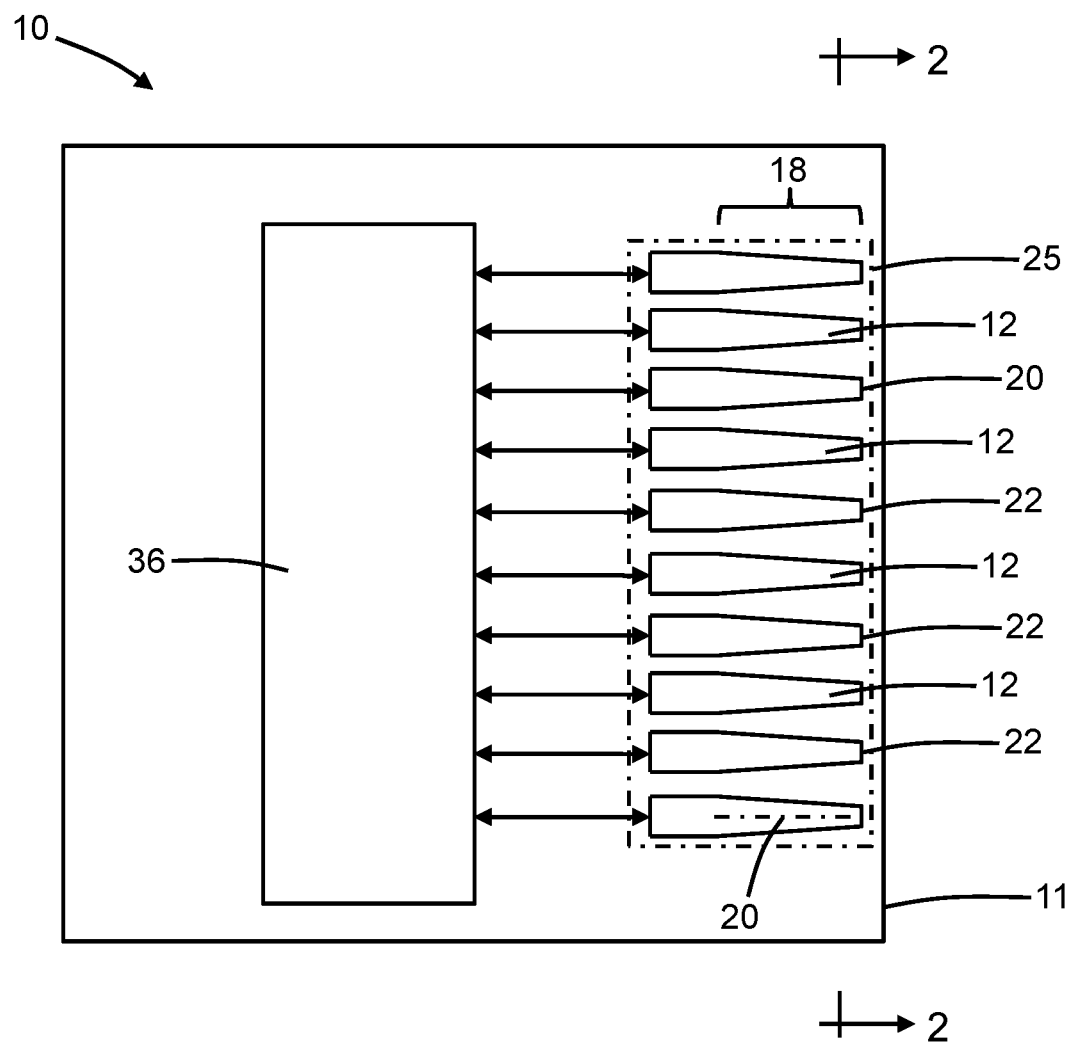
FIG. 1 is a top view of a structure for a photonics chip including an optical input/output interface at an initial fabrication stage of a processing method in accordance with embodiments of the invention.
Figure 2:
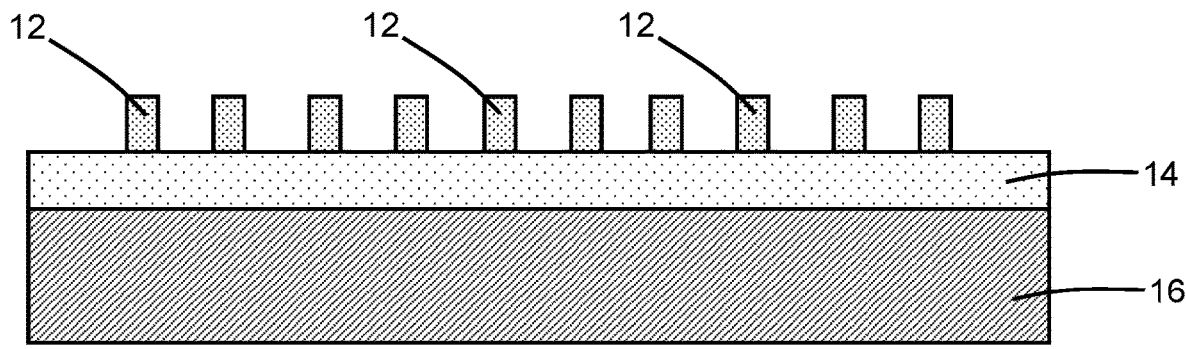
FIG. 2 is a cross-sectional view of the structure taken generally along line 2-2 in FIG. 1.

With reference to FIGS. 1, 2 and in accordance with embodiments of the invention, a photonics chip 10 includes waveguide cores 12 that are disposed on, and over, a dielectric layer 14 and a semiconductor substrate 16. In an embodiment, the dielectric layer 14 may be comprised of a dielectric material, such as silicon dioxide, and the semiconductor substrate 16 may be comprised of a semiconductor material, such as single-crystal silicon. In an embodiment, the dielectric layer 14 may be a buried oxide layer of a silicon-on-insulator substrate, and the dielectric layer 14 may be disposed between the waveguide cores 12 and the semiconductor substrate 16. The dielectric layer 14 may function as a lower cladding layer for the waveguide cores 12.

In an embodiment, the waveguide cores 12 may be comprised of a material having a refractive index that is greater than the refractive index of silicon dioxide. In an embodiment, the waveguide cores 12 may be comprised of a semiconductor material. In an embodiment, the waveguide cores 12 may be comprised of single-crystal silicon. In an embodiment, the waveguide cores 12 may be comprised of polysilicon or amorphous silicon. In an embodiment, the waveguide cores 12 may be comprised of a dielectric material, such as silicon nitride, silicon oxynitride, or aluminum nitride. In alternative embodiments, other materials, such as a polymer or a III-V compound semiconductor, may be used to form the waveguide cores 12.

In an embodiment, the waveguide cores 12 may be formed by patterning a layer comprised of their constituent material with lithography and etching processes. In an embodiment, the waveguide cores 12 may be formed by patterning the semiconductor material (e.g., single-crystal silicon) of a device layer of a silicon-on-insulator substrate. In an embodiment, the waveguide cores 12 may be formed by patterning a deposited layer comprised of their constituent material (e.g., silicon nitride, polysilicon, or amorphous silicon). In an embodiment, the waveguide cores 12 may be disposed within the same plane.

In an embodiment, each waveguide core 12 may include a section in the representative form of a tapered section 18 defining an optical coupler that is disposed adjacent to an edge 11 of the photonics chip 10. In an embodiment, the edge 11 may be a physical boundary of the semiconductor substrate 16 that is defined by, for example, dicing. Each tapered section 18 may extend along a longitudinal axis 20 and may terminate at an end 22. Each tapered section 18 may have a width dimension that increases with increasing distance from the end 22. The waveguide cores 12 may be coupled, as indicated by the double-headed arrows, to other optical components 24 (FIG. 8) on the photonics chip 10. In an embodiment, the tapered sections 18 may receive light that is that is routed by the waveguide cores 12 to the other optical components 24 and/or light may be routed from the other optical components 24 by the waveguide cores 12 to the tapered sections 18 for transfer off of the photonics chip 10.

The tapered sections 18 of the waveguide cores 12 may be positioned in an array at different positions with tips at the ends 22 that are adjacent to the edge 11 of the photonics chip 10. In an embodiment, the tapered sections 18 may constitute the optical couplers of an optical input/output interface 25 of the photonics chip 10. In an embodiment, the longitudinal axes 20 of the tapered sections 18 may be aligned perpendicular to the edge 11. In an embodiment, the longitudinal axes 20 of the tapered sections 18 may be aligned at an acute angle relative to the edge 11. The optical couplers represented by the tapered sections 18 may be arranged with a low pitch within the optical input/output interface 25 to provide a high density of optical paths for light transfer to and/or from the waveguide cores 12.

Figure 3:
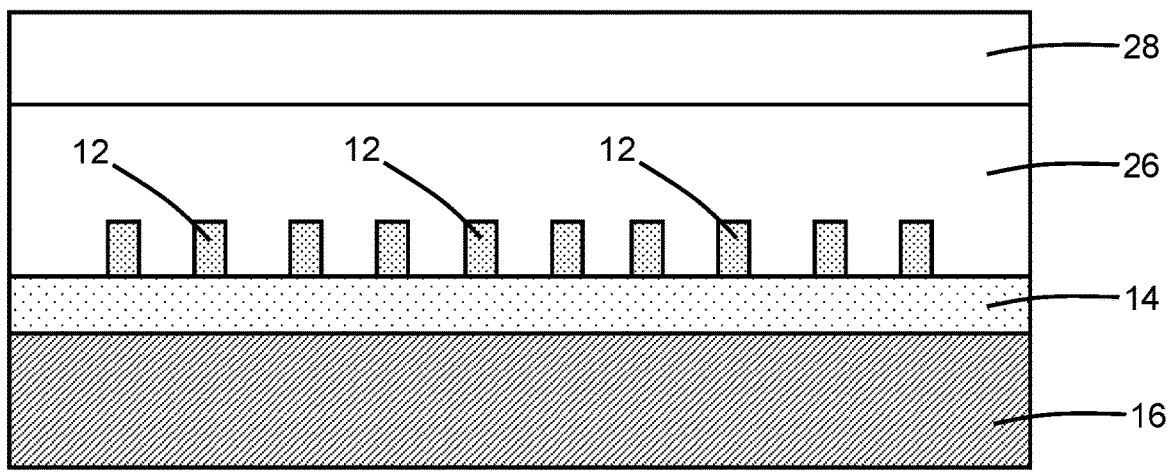
FIG. 3 is a cross-sectional view of the structure at a fabrication stage subsequent to FIG. 2.

With reference to FIG. 3 in which like reference numerals refer to like features in FIG. 2 and at a subsequent fabrication stage, a dielectric layer 26 is formed over the waveguide cores 12 and optical components 24. In an embodiment, the waveguide cores 12 may be embedded in the dielectric layer 26, which may be thicker than the waveguide cores 12. The dielectric layer 26 may be comprised of a homogenous dielectric material, such as silicon dioxide, that is deposited and then planarized following deposition. The dielectric material constituting the dielectric layer 26 may have a refractive index that is less than the refractive index of the material constituting the waveguide cores 12.

A back-end-of-line stack 28 may be formed over the dielectric layer 26. The back-end-of-line stack 28 may include stacked dielectric layers in which each dielectric layer is comprised of a dielectric material, such as silicon dioxide, silicon nitride, tetraethylorthosilicate silicon dioxide, or fluorinated-tetraethylorthosilicate silicon dioxide.

In an alternative embodiment, the back-end-of-line stack 28 may be absent over the optical input/output interface 25 such that only the dielectric layer 26 is disposed over the tapered sections 18. In an alternative embodiment, the semiconductor substrate 16 beneath the optical input/output interface 25 may include an undercut formed in the semiconductor substrate 16 such that each tapered section 18 is disposed on a membrane locally defined by the undercut dielectric layer 14.

Figure 4:
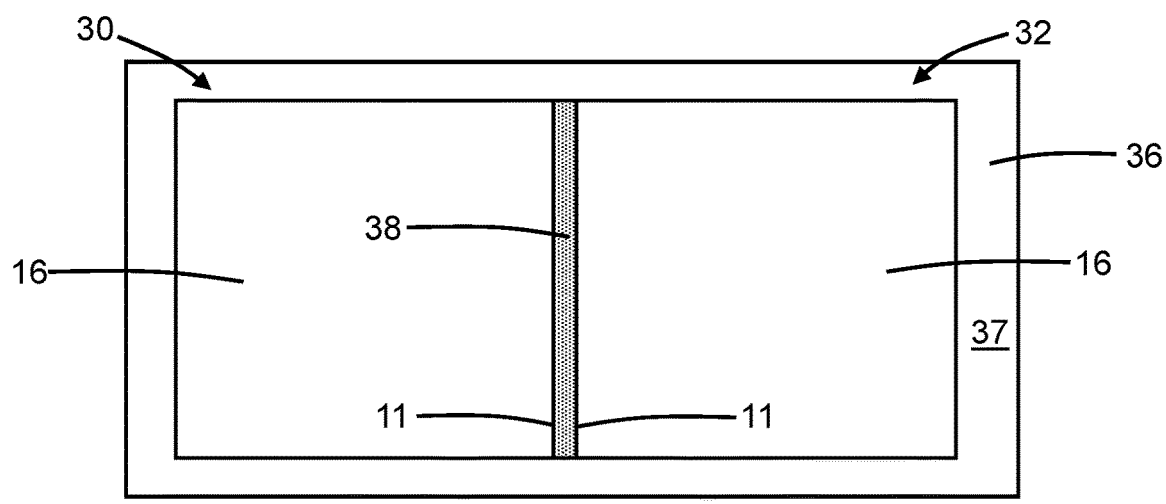
FIG. 4 is a top view of a structure including photonic chips with adjacent optical input/output interfaces in accordance with embodiments of the invention.
Figure 4A:
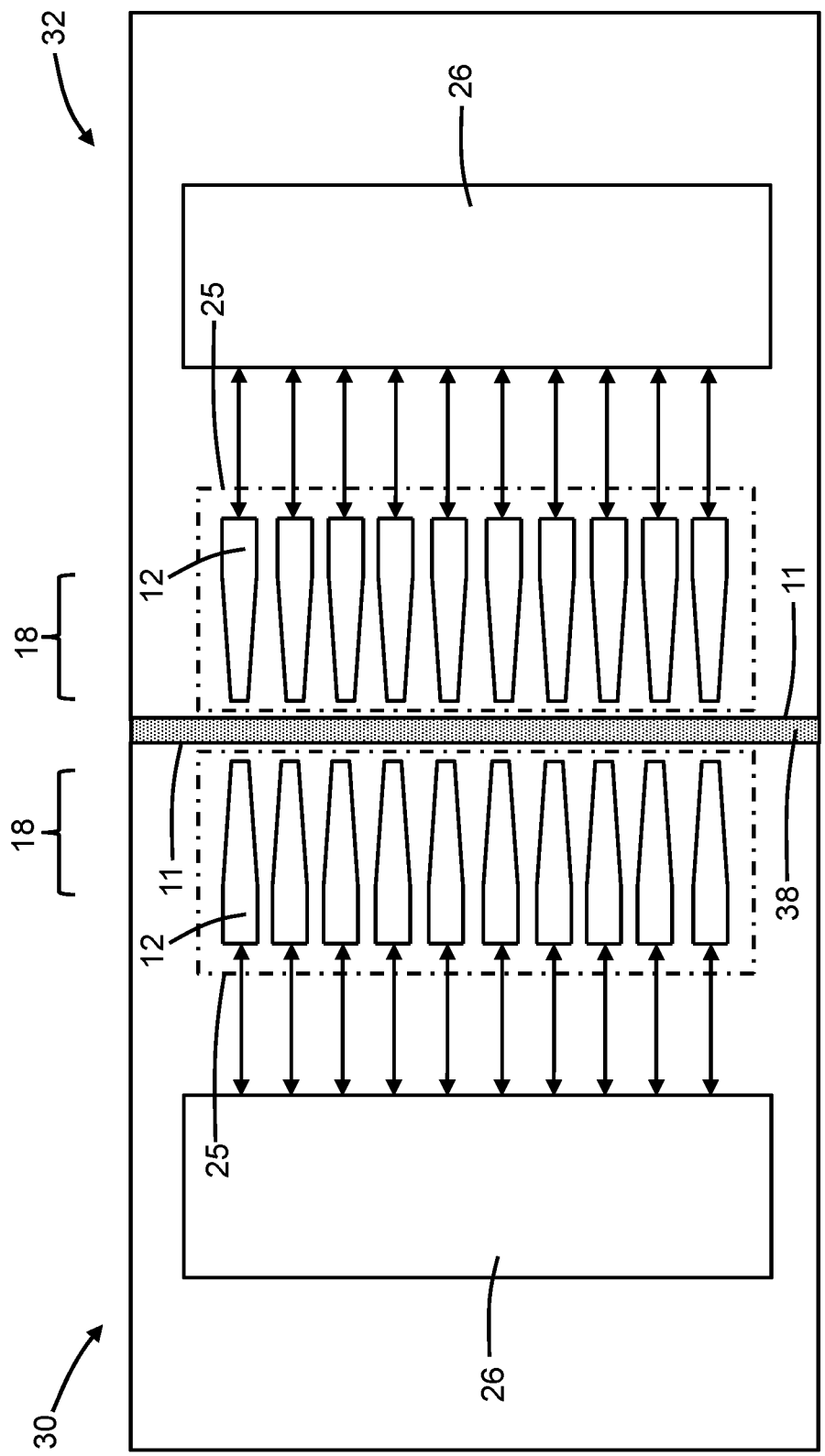
FIG. 4A is a bottom view of the structure of FIG. 4 in which the support substrate and dielectric layers of the photonics chips are omitted for clarity of description.
Figure 5:
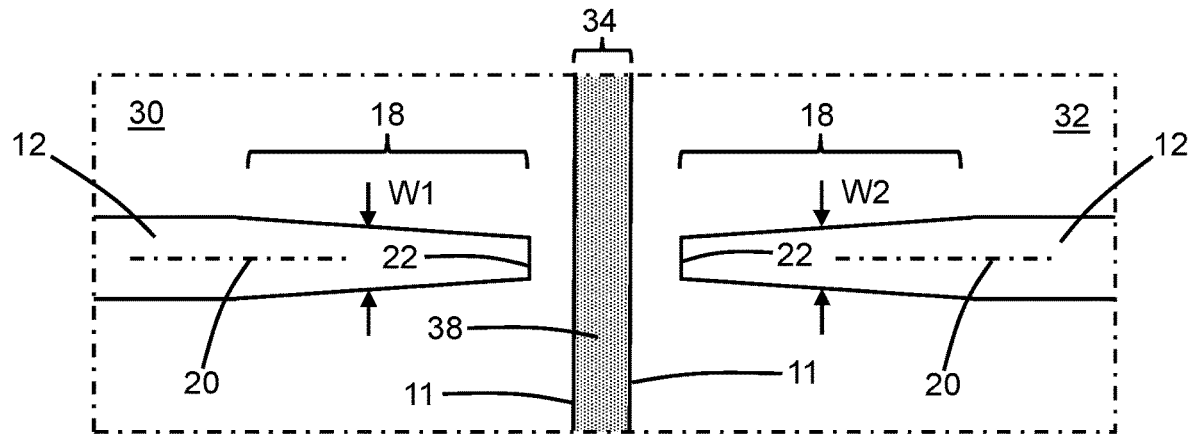
FIG. 5 is a top view of an adjacent pair of optical couplers in the optical input/output interfaces of the photonics chips of FIG. 4A.

With reference to FIGS. 4, 4A, and 5 in which like reference numerals refer to like features in FIG. 1 and in accordance with embodiments of the invention, a chip 30 representing an instance of the photonics chip 10 and a chip 32 representing a different instance of the photonics chip 10 may be arranged on a support substrate 36. In an embodiment, the support substrate 36 may be a bulk silicon substrate. In an alternative embodiment, the support substrate 36 may be a sapphire substrate. The chip 30 and the chip 32 may be placed in a contacting relationship with the support substrate 36 and bonded to the support substrate 36 by dielectric bonding or hybrid bonding. In an embodiment, the chip 30 and the chip 32 may be inverted, and the back-end-of-line stack 28 of each of the chips 30, 32 may be placed in direct contact with a reference surface 37 of the support substrate 36. In an embodiment, after the chips 30, 32 are placed in the contacting relationship with the support substrate 36, a low temperature thermal anneal may be performed at a sufficient temperature and for a sufficient duration to establish a face-to-face bond between the contacting surfaces of the chip 30 and the support substrate 36 and to establish a face-to-face bond between the contacting surfaces of the chip 32 and the support substrate 36. In an embodiment, the face-to-face bonds may be established between the contacting surfaces of back-end-of-line stack 28 of each of the chips 30, 32 and the reference surface 37 of the support substrate 36.

The chips 30, 32 are disposed adjacent to each other on the support substrate 36 with the respective edges 11 aligned. The chips 30, 32 may be separated by a gap 34 between the adjacent edges 11 of the chips 30, 32. In an embodiment, the gap 34 may have a width dimension of less than or equal to ten (10) microns. The tapered sections 18 of the optical input/output interface 25 on the chip 30 may be positioned adjacent to the tapered sections 18 of the optical input/output interface 25 on the chip 32. In an embodiment, each of the tapered sections 18 of the optical input/output interface 25 on the chip 30 may be positioned across the gap 34 from one of the tapered sections 18 of the optical input/output interface 25 on the chip 32 with their respective ends 22 adjacent to each other but separated by the gap 34. Each tapered section 18 of the optical input/output interface 25 on the chip 30 may be an inverse taper having a width dimension W1 that increases with increasing distance from the end 22 and with increasing distance from the edge 11 of the chip 30. Each tapered section 18 of the optical input/output interface 25 on the chip 32 may be an inverse taper having a width dimension W2 that increases with increasing distance from the end 22 and with increasing distance from the edge 11 of the chip 32. The tapered sections 18 on the chip 30 and the tapered section 18 on the chip 32 are configured to transfer light through mode size and mode shape changes, and without physical connections to each other. In that regard, the tapered sections 18 on the chip 30 are disconnected from the tapered section 18 on the chip 32 and lack physical connections to each other across the gap 34.

The reference surface 37 on which the chips 30, 32 are disposed may define a reference plane that assists with minimizing the vertical misalignment of the tapered sections 18 on the chip 30 with the tapered sections 18 on the chip 32. In an embodiment, a portion of the gap 34 between the edge 11 of the chip 30 and the edge 11 of the chip 32 may be filled by an index-matching fluid 38, such as an optical adhesive, that promotes light transfer between the tapered sections 18 on the chip 30 and the tapered sections 18 on the chip 32. In an embodiment, the gap 34 between the edge 11 of the chip 30 and the edge 11 of the chip 32 may be fully filled by the index-matching fluid 38. In an alternative embodiment, the chips 30, 32 may be inverted and flip-chip mounted by bond pads and solder bumps to the support substrate 36.

In use, light (e.g., laser light) may be coupled and transferred in a lateral direction across the gap 34 between the optical input/output interface 25 including the tapered sections 18 on the chip 30 and the optical input/output interface 25 including the tapered sections 18 on the chip 32. In an embodiment, the light may be coupled and transferred in a lateral direction across the gap 34 from the tapered sections 18 on the chip 30 to the tapered sections 18 on the chip 32.

In an embodiment, the light may be coupled and transferred in a lateral direction across the gap 34 from the tapered sections 18 on the chip 32 to the tapered sections 18 on the chip 30. The light transfer occurs in free space between the tapered sections 18 on the chip 30 and the tapered sections 18 on the chip 32.

The optical input/output interfaces 25 include multiple optical couplers opposing each other across the gap 34 that enable efficient chip-to-chip communication by multiple channels each characterized by low insertion loss and high bandwidth. The chip-to-chip communication of the multi-chip optical system is achieved without the use of photonic wire bonding. The tapered sections 18 representing the optical couplers rely on mode size adjustment to enable a high-density array for chip-to-chip optical communication. In an embodiment, the optical couplers represented by the tapered sections 18 on the chip 30 may be identical to the optical couplers represented by the tapered sections 18 on the chip 32. In an embodiment, the optical couplers represented by the tapered sections 18 on the chip 30 may differ from the optical couplers represented by the tapered sections 18 on the chip 32.

Figure 6:
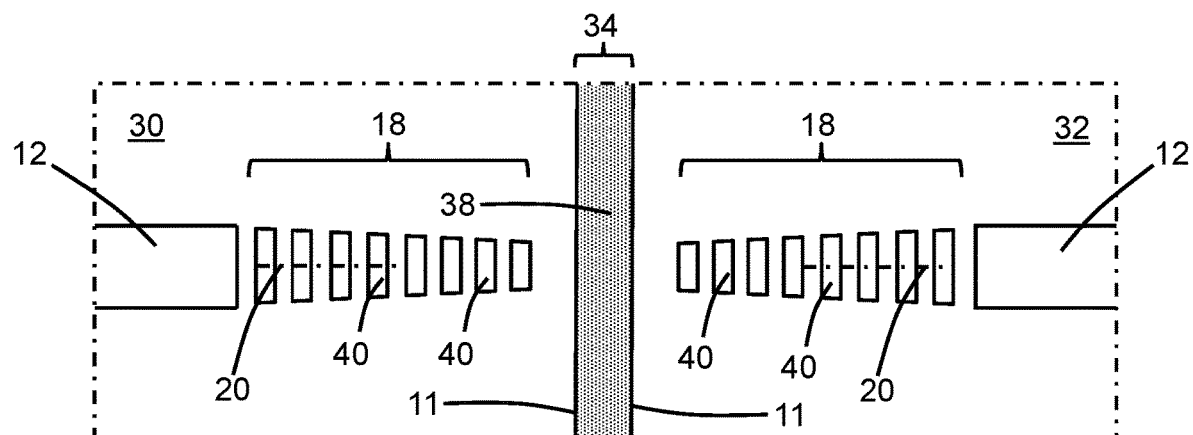
FIG. 6 is a top view of an adjacent pair of optical couplers in the optical input/output interfaces of the photonics chips of FIG. 4A.

With reference to FIG. 6 and in accordance with alternative embodiments of the invention, each tapered section 18 of the optical input/output interface 25 on the chip 30 and each tapered section 18 of the optical input/output interface 25 on the chip 32 may be segmented such that the optical couplers have a different configuration. Specifically, each tapered section 18 may be divided into segments 40 that are distributed in a spaced arrangement along the longitudinal axis 20. In an embodiment, the pitch and duty cycle of the segments 40 may be uniform to define a periodic arrangement. In alternative embodiments, the pitch and/or the duty cycle of the segments 40 may be apodized (i.e., non-uniform) to define a non-periodic arrangement. The segments 40 may be dimensioned and positioned at small enough pitch so as to define sub-wavelength grating-like structures.

The dielectric layer 26 (FIG. 3) is disposed in the gaps between adjacent pairs of the segments 40. In an embodiment, the dielectric material of the dielectric layer 26 may fully fill the gaps. The segments 40 of each tapered section 18 and the dielectric material of the dielectric layer 26 in the gaps between adjacent pairs of segments 40 may define a metamaterial structure in which the material constituting the segments 40 has a higher refractive index than the dielectric material of the dielectric layer 26. Each metamaterial structure can be treated as a homogeneous material having an effective refractive index that is intermediate between the refractive index of the material constituting the segments 40 and the refractive index of the dielectric material of the dielectric layer 26.

Figure 7:
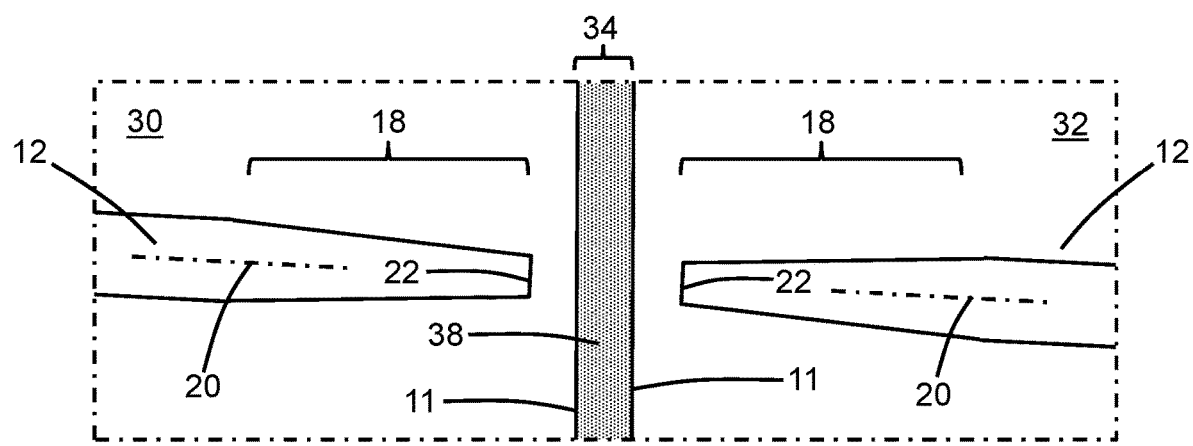
FIG. 7 is a top view of an adjacent pair of optical couplers in the optical input/output interfaces of the photonics chips of FIG. 4A.

With reference to FIG. 7 and in accordance with alternative embodiments of the invention, each tapered section 18 of the optical input/output interface 25 on the chip 30 may be tilted such that the longitudinal axes 20 are angled relative to the adjacent edge 11, and each tapered section 18 of the optical input/output interface 25 on the chip 32 may be tilted such that the longitudinal axes 20 are angled relative to the adjacent edge 11. The tilting of the longitudinal axes 20 may be effect to reduce back reflection of the light transmitted by opposing optical couplers across the gap 34.

Figure 8:
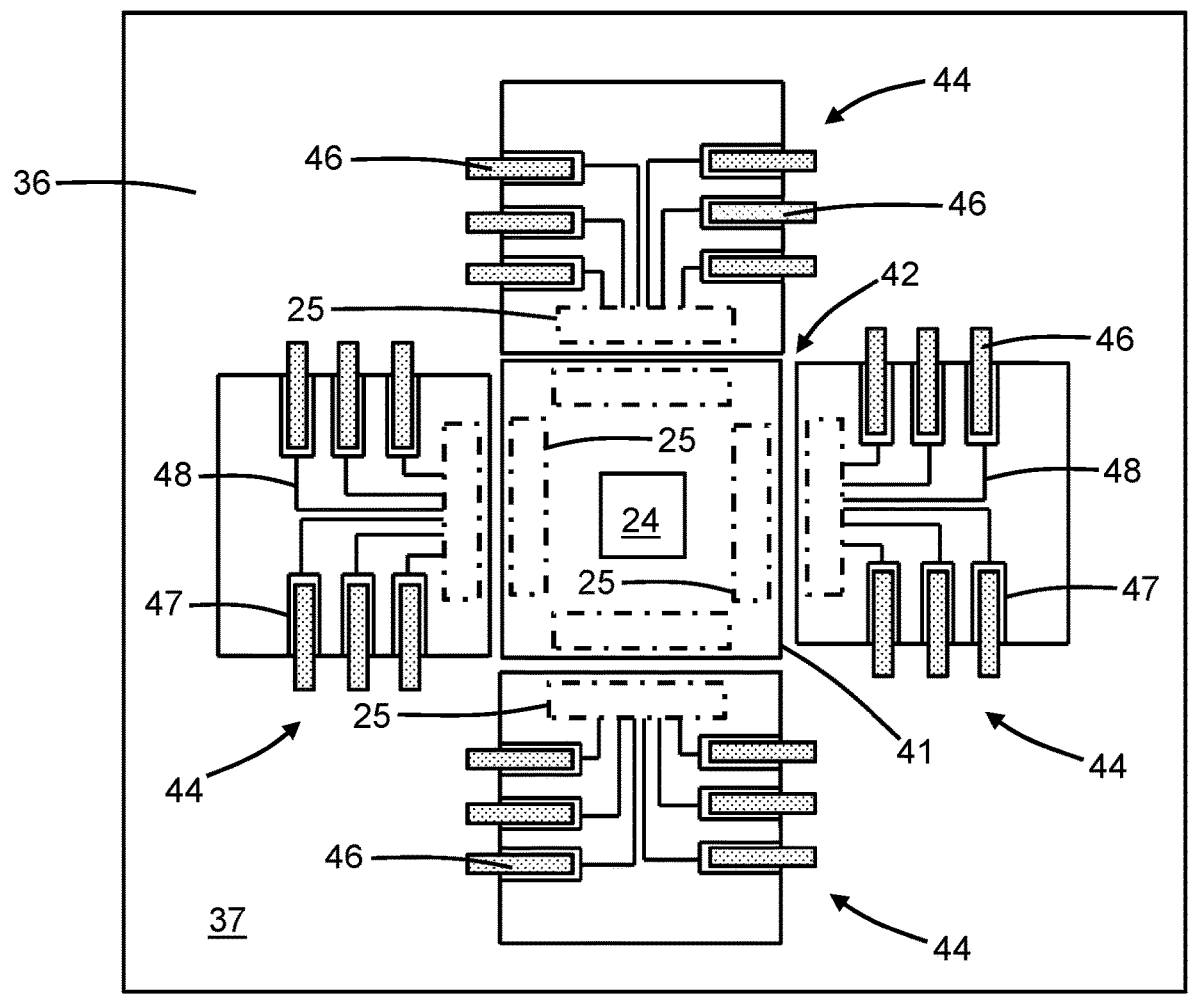
FIG. 8 is a top view of a structure with multiple photonics chips having optical input/output interfaces in accordance with alternative embodiments of the invention.

With reference to FIG. 8 and in accordance with alternative embodiments of the invention, a chip 42 similar to the photonics chip 10 may be configured with multiple optical input/output interfaces 25 each including tapered sections 18 that are coupled by waveguide cores 12 to the optical components 24 on the chip 42. Multiple chips 44 may be arranged about the edges 41 of the chip 42, and each of the chips 44 may include an optical input/output interface 25 that is coupled to one of the optical input/output interfaces 25 of the chip 42. Each of the chips 44 may be coupled to waveguide cores 48 that connect the optical couplers of its optical input/output interface 25 with the multiple optical fibers 46. Each chip 44 may include a set of grooves 47 configured to receive the tips of the optical fibers 46 and into which the tips of the optical fibers 46 are inserted. Each waveguide core 48 may include a spot-size converter disposed adjacent to the output from one of the optical fibers 46.

The chip 42 may provide a core chip that includes the optical components 24 and the chips 44 may provide service chips that are interfaced by the optical input/output interfaces 25 to the chip 42. The optical couplers of the optical input/output interface 25 on each chip 44 may be aligned with the optical couplers of one of the optical input/output interfaces 25 on the chip 42 to form the multi-chip optical system. The chips 44 and the optical input/output interfaces 25 coupling the chips 44 to the optical input/output interfaces on the chip 42 permit the number of optical fibers 46 interfaced with the optical components 24 on the chip 42 to be increased.

Figure 9:
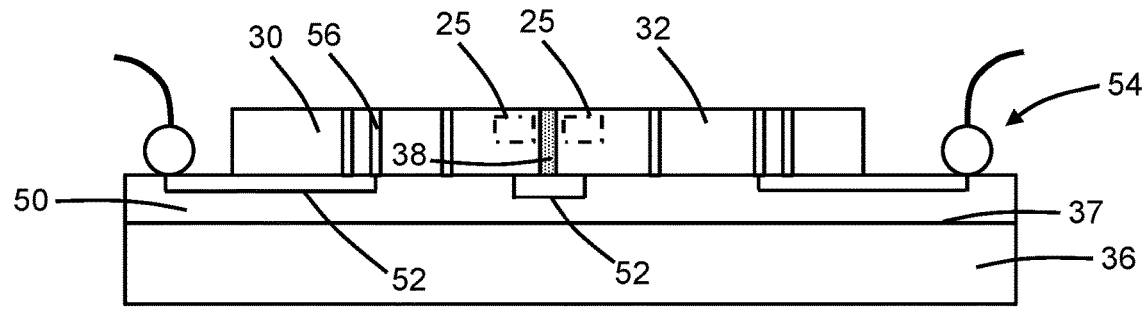
FIG. 9 is a cross-sectional view of a structure including photonics chips with optical input/output interfaces in accordance with alternative embodiments of the invention.

With reference to FIG. 9 and in accordance with alternative embodiments of the invention, an interposer 50 may be disposed between the chips 30, 32 and the support substrate 36. The interposer 50 defines an intermediate layer configured with electrical interconnections 52 to enable routing of power and signals to the chips 30, 32, and wire bonds 54 are provided to enable external electrical connections to the interposer 50. The electrical interconnections 52 may also permit inter-chip electrical communication between the chip 30 and the chip 32. Each of the chips 30, 32 may include through-silicon vias 56 to enable communication between electrical and optical components on the chips 30, 32 and the electrical interconnections 52 of the interposer 50. Each of the chips 30, 32 may include waveguide cores 48 that are interfaced with optical fibers 46, as shown in FIG. 8, to enable off-chip optical communication. The respective optical input/output interfaces 25 permit the chips 30, 32 to optically communicate with each other.

Figure 10:
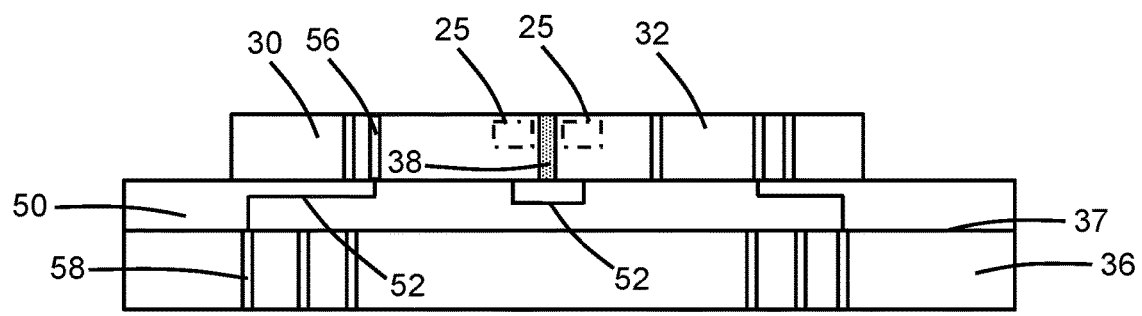
FIG. 10 is a cross-sectional view of a structure including photonics chips with optical input/output interfaces in accordance with alternative embodiments of the invention.

With reference to FIG. 10 in which like reference numerals refer to like features in FIG. 9 and in accordance with alternative embodiments of the invention, the support substrate 36 may be modified to include through-silicon vias 58 that are coupled to the electrical interconnections 52 of the interposer 50. The through-silicon vias 58, which may replace the wire bonds 54 (FIG. 9), may be used, for example, to provide power from the backside of the support substrate 36 to the chips 30, 32. The support substrate 36 and interposer 50 provide an active electrical integrated circuit that is coupled to the chips 30, 32.

Figure 11:
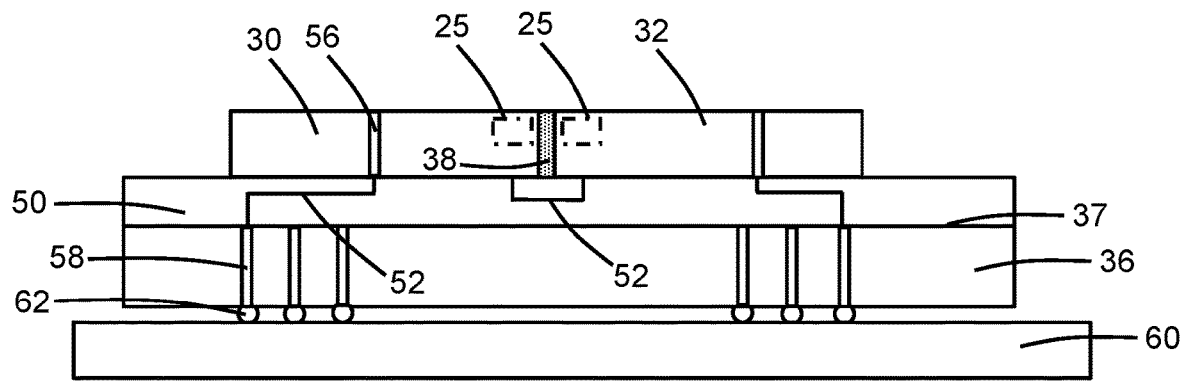
FIG. 11 is a cross-sectional view of a structure including photonics chips with optical input/output interfaces in accordance with alternative embodiments of the invention.

With reference to FIG. 11 in which like reference numerals refer to like features in FIG. 10 and in accordance with alternative embodiments of the invention, the support substrate 36 may be attached to a printed circuit board 60 by reflowed solder balls 62 that couple bond pads on the support substrate 36 with complementary bond pads on the printed circuit board 60. The printed circuit board 60 may include a ground plane and a power plane used to deliver ground and power potentials through the active electrical integrated circuit to the chips 30, 32.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present to provide indirect contact. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    an interposer including a first electrical interconnection;
    a first photonics chip including a first edge and a first plurality of optical couplers disposed at the first edge; and
    a second photonics chip including a second edge adjacent to the first edge and a second plurality of optical couplers, the second plurality of optical couplers disposed at the second edge adjacent to the first plurality of optical couplers,
    wherein the first photonics chip and the second photonics chip are disposed on the interposer, and the first photonics chip and the second photonics chip are coupled by the first electrical interconnection for electrical communication through the interposer.

2. The structure of claim 1 wherein each of the first plurality of optical couplers comprises a first metamaterial structure that includes a first plurality of segments and a first dielectric material that is disposed in gaps between the first plurality of segments.

3. The structure of claim 2 wherein each of the second plurality of optical couplers comprises a second metamaterial structure that includes a second plurality of segments and a second dielectric material disposed in gaps between adjacent pairs of the second plurality of segments.

4. The structure of claim 1 wherein each of the first plurality of optical couplers comprises a first tapered section having a first end disposed adjacent to the first edge and a first width that increases with increasing distance from the first end.

5. The structure of claim 4 wherein each of the second plurality of optical couplers comprises a second tapered section having a second end disposed adjacent to the second edge and a second width that increases with increasing distance from the second end.

6. The structure of claim 1 wherein the first edge of the first photonics chip and the second edge of the second photonics chip are separated by a gap, and the first plurality of optical couplers are disposed across the gap from the second plurality of optical couplers.

7. The structure of claim 6 wherein each of the first plurality of optical couplers is configured to transfer light in free space across the gap to one of the second plurality of optical couplers.

8. The structure of claim 1 wherein the first plurality of optical couplers lack physical connections to the second plurality of optical couplers.

9. The structure of claim 1 wherein each of the first plurality of optical couplers includes a first longitudinal axis that is tilted relative to the first edge, and each of the second plurality of optical couplers includes a second longitudinal axis that is tilted relative to the second edge.

10. The structure of claim 1 wherein the first photonics chip includes a plurality of optical components, and each of the first plurality of optical couplers is coupled to the plurality of optical components.

11. The structure of claim 1 wherein the first edge of the first photonics chip and the second edge of the second photonics chip are separated by a gap, and further comprising:
    an optical adhesive disposed in the gap.

12. The structure of claim 1 wherein the first photonics chip includes a plurality of grooves, and each groove is configured to receive an optical fiber.

13. The structure of claim 12 wherein each of the first plurality of optical couplers is optically coupled to a respective optical fiber in each of the plurality of grooves.

14. The structure of claim 1 wherein the second photonics chip includes a third edge different from the second edge and a third plurality of optical couplers disposed at the third edge.

15. The structure of claim 1 wherein the interposer includes a second electrical interconnection and a third electrical interconnection, the first photonics chip includes a first through-silicon via coupled to the second electrical interconnection, and the second photonics chip includes a second through-silicon via coupled to the third electrical interconnection.

16. A method comprising:
  forming a first photonics chip including a first edge and a first plurality of optical couplers disposed at the first edge; and
  forming a second photonics chip including a second edge adjacent to the first edge and a second plurality of optical couplers disposed at the second edge adjacent to the first plurality of optical couplers,
  wherein the first photonics chip and the second photonics chip are disposed on an interposer, the interposer includes an electrical interconnection, and the first photonics chip and the second photonics chip are coupled by the electrical interconnection for electrical communication through the interposer.

17. The structure of claim 1 further comprising:
  a support substrate,
  wherein the interposer is disposed between the first photonics chip and the support substrate, and the interposer is disposed between the second photonics chip and the support substrate.

18. The structure of claim 15 further comprising:
  a support substrate,
  wherein the interposer is disposed between the first photonics chip and the support substrate, and the interposer is disposed between the second photonics chip and the support substrate.

19. The structure of claim 18 wherein the support substrate includes a first through-silicon via that is coupled to the second electrical interconnection, and the support substrate includes a second through-silicon via that is coupled to the third electrical interconnection.

\* \* \* \* \*